United States Patent
Hansen et al.

(10) Patent No.: US 9,522,626 B2
(45) Date of Patent: Dec. 20, 2016

(54) BLADE TIP CLAMP ARRANGEMENT

(71) Applicant: SIEMENS AKTIENGESELLSCHAFT, München (DK)

(72) Inventors: Steen Mattrup Hansen, Svendborg (DK); Aage Mastrup, Spjald (DK); Kenneth Helligsoe Svinth, Aarhus (DK)

(73) Assignee: SIEMENS AKTIENGESELLSCHAFT (DE)

( * ) Notice: Subject to any disclaimer, the term of this patent is extended or adjusted under 35 U.S.C. 154(b) by 0 days.

(21) Appl. No.: 14/662,447

(22) Filed: Mar. 19, 2015

(65) Prior Publication Data

US 2015/0337799 A1 Nov. 26, 2015

(30) Foreign Application Priority Data

May 23, 2014 (EP) .................................... 14169673

(51) Int. Cl.
*B60P 7/08* (2006.01)
*B60P 3/40* (2006.01)
*F03D 1/00* (2006.01)

(52) U.S. Cl.
CPC ............... *B60P 3/40* (2013.01); *F03D 1/005* (2013.01); *Y02E 10/72* (2013.01); *Y10T 29/49828* (2015.01)

(58) Field of Classification Search
CPC ............ B60P 3/40; F03D 1/005; Y02E 10/72
USPC ..... 410/44, 45, 120, 53, 34, 35, 38; 280/404
See application file for complete search history.

(56) References Cited

U.S. PATENT DOCUMENTS

| | | | | |
|---|---|---|---|---|
| 4,416,571 A | * | 11/1983 | Krause .................. | B60P 1/6418 410/45 |
| 8,096,739 B1 | * | 1/2012 | Landrum .................. | B60P 3/40 410/45 |
| 8,366,360 B2 | * | 2/2013 | Krogh ...................... | B60P 3/40 410/44 |
| 2007/0189895 A1 | | 8/2007 | Kootstra | |

FOREIGN PATENT DOCUMENTS

| | | |
|---|---|---|
| DE | 202012009278 U1 | 1/2013 |
| WO | WO 03057528 A1 | 7/2003 |
| WO | WO 2004/041589 A1 | 5/2004 |
| WO | WO 2006/000230 A1 | 1/2006 |
| WO | WO 2008/104185 A1 | 9/2008 |
| WO | WO2009141018 A2 | 11/2009 |
| WO | WO 2011/124574 A1 | 10/2011 |

(Continued)

OTHER PUBLICATIONS

European Search Report for European Application No. 14169673.2, mailed on Oct. 21, 2014.

*Primary Examiner* — Stephen Gordon

(74) *Attorney, Agent, or Firm* — Schmeiser Olsen & Watts LLP

(57) ABSTRACT

A blade tip clamp arrangement configured to support a wind turbine rotor blade, including at least a tip clamp assembly configured to hold the rotor blade along an airfoil portion of the rotor blade, and a pivot connection interface configured to pivotably connect the tip clamp assembly to a wheeled transport means, is provided. A rotor blade transport and storage arrangement configured for the storage and transport of a wind turbine rotor blade, and a method of handling a wind turbine rotor blade during transport and storage is also provided.

13 Claims, 8 Drawing Sheets

(56) References Cited

FOREIGN PATENT DOCUMENTS

| WO | WO 2012/019895 A1 | 2/2012 |
| WO | WO 2012/171895 A1 | 12/2012 |
| WO | WO 2013/110405 A1 | 8/2013 |

* cited by examiner

BLADE TIP CLAMP ARRANGEMENT

CROSS-REFERENCE TO RELATED APPLICATIONS

This application claims priority to EP Application No. 14169673.2, having a filing date of May 23, 2014, the entire contents of which are hereby incorporated by reference.

FIELD OF TECHNOLOGY

The following describes a blade tip clamp arrangement, a rotor blade transport and storage arrangement, and a method of handling a wind turbine rotor blade during transport and storage.

BACKGROUND

After manufacturing a wind turbine rotor blade, the blade may need to be transported to a short-term or long-term storage facility, and ultimately the blade will be transported to an installation site, for example at an offshore windfarm. Transport modes can include ship transport or road and/or rail transport over land. For a wind turbine with a rated power output of several megawatts, a rotor blade can have a length in excess of 75 m, and may weigh several tons. Generally, a wind turbine rotor blade comprises a circular root end for mounting to a pitch interface of a hub. The root end of a blade for such a large wind turbine can have a diameter in the range of 2.0 to 4.0 m or more. The circular shape of the root end undergoes a transition towards the blade airfoil portion, which accounts for most of the blade length. The airfoil portion is generally widest close to the root end, and tapers to a narrow end or tip. The airfoil section of the blade has a rounded leading edge and a relatively sharp trailing edge. Between the leading edge and the trailing edge, the airfoil section has a curved convex upper surface (the "suction" side), and a curved concave lower surface (the "pressure side"). The unwieldy shape and dimensions of a wind turbine rotor blade make transport difficult. Furthermore, the blade is quite vulnerable to damage and must therefore be treated with care throughout all transport and handling stages to ensure that the surface remains smooth and intact.

The own weight of a rotor blade may present a problem during a lifting manoeuvre. For this reason, it is generally preferred to bring the blade into an "upright" position, i.e. a position in which the airfoil is essentially "vertical" or upright with the leading edge of the blade underneath and the trailing edge on top, while the blade itself is suspended horizontally from root end to tip end. This blade orientation also helps ensure that the vulnerable trailing edge of the blade is protected from damage, while the relatively straight leading edge has sufficient structural strength to prevent the blade from bending while suspended in the air.

During a storage or transport stage, several rotor blades may be arranged in an array of stacked frames. To fit many blades into a relatively small volume, the blades may be "inter-leaved" with the tip ends of some blades facing towards the root ends of other blades. Such a stacking arrangement must consider the height difference between the root portion of a blade and the relatively flat and narrow airfoil portion near the tip end. Furthermore, a blade should be stored so that it is not distorted by its own weight.

Between manufacture and installation of a rotor blade, it must be moved and handled several times, for example from a manufacturing facility to a storage facility, from storage to truck, from truck to ship, etc. Each handling stage may involve a change in orientation of the blade for the reasons given above. Furthermore, the blade must at all times be securely connected to any holding, lifting, hoisting or transport means. This may involve transfer between different holding means, for example because of different mounting structures or connection interfaces of a storage means and/or a transport means. Such connection procedures are time-consuming and costly and can significantly add to the overall costs of a wind turbine.

SUMMARY

An aspect relates to improving handling wind turbine rotor blades during transport and storage.

According to embodiments of the invention, the blade tip clamp arrangement is realised to support a wind turbine rotor blade and comprises at least a tip clamp assembly realised to clamp about the leading edge of the rotor blade along an airfoil portion of the rotor blade; and a pivot connection interface realised to pivotably connect the tip clamp assembly to a wheeled transport means.

In the context of embodiments of the invention, the expression "to hold the rotor blade along an airfoil portion" is to be understood to mean that the tip clamp assembly grips or otherwise securely holds the rotor blade at a point, or over a length of, the airfoil portion of the blade, which, as described above, is that part of the blade which has an airfoil shape in cross-section. The blade can be supported at one or more other points during transport and storage. For example, a blade is usually also held at the root end of the blade by an appropriate root end support structure.

An advantage of the blade tip clamp arrangement according to embodiments of the invention is that transport and storage of the blade can be greatly simplified. The pivot connection allows the blade tip clamp arrangement to be easily connected to the wheeled transport means, which can be any of a dolly, a trailer, a truck, a railcar, etc. As mentioned above, the length of a rotor blade for an offshore installation can exceed 70 m, and prior art methods of transport and storage are made costly and time-consuming by the difficulty in manoeuvring such a long blade. The tip clamp assembly according to embodiments of the invention is characterized by the pivot connection, which allows the wheeled transport means to alter its path of travel independently of the blade. This makes it easier to move the blade from one location to another, for example, from a storage facility to a transport vessel, while at the same time ensuring that the blade is always held securely by the tip clamp assembly.

According to embodiments of the invention, the rotor blade transport and storage arrangement is realised for the storage and transport of a wind turbine rotor blade and comprises a blade tip clamp arrangement according to embodiments of the invention for supporting the rotor blade along an airfoil portion of the rotor blade, and a root end bracket for supporting the rotor blade root end.

An advantage of the rotor blade transport and storage arrangement according to embodiments of the invention is that the blade tip clamp arrangement, used to assist in moving the rotor blade from one location to another, can also be used to support the airfoil portion during short-term or long-term storage. The root end bracket of the transport and storage arrangement according to embodiments of the invention can also be used during both storage and transport phases. This means that relatively little direct handling of the blade is required, since the tip clamp assembly and the root end bracket can be mounted to the rotor blade once during an initial preparation step, and can remain in their mounted state until a final stage, for example, until the blade has arrived at the installation site.

According to embodiments of the invention, the method of handling a wind turbine rotor blade during transport and storage comprises the steps of clamping a tip clamp assembly of a blade tip clamp arrangement according to embodiments of the invention about an airfoil portion of the rotor blade, mounting the tip clamp assembly to a supporting means in a first blade orientation for blade storage and/or blade transport, and/or mounting the tip clamp assembly to a supporting means in a second blade orientation for storage and/or transport, and/or connecting the pivot connection interface of the blade tip clamp arrangement to a wheeled transport means for a transport manoeuvre.

An advantage of the method according to embodiments of the invention is that, with relatively little effort, the rotor blade can be manoeuvred safely and securely during different transport stages, and can be held safely and securely during storage stages. Throughout these transport and storage stages, it is not necessary to alter the position of the tip clamp assembly relative to the blade; neither is it necessary to remove it or to re-attach it, even though the blade may need to be held in two different positions, for example in a first position with an essentially "flat" airfoil, and a second position with an essentially "upright" airfoil. The method according to embodiments of the invention may therefore offer considerable savings in the cost of handling and storing wind turbine rotor blades, particularly when many blades, intended for an offshore windfarm site, must be loaded from an initial storage facility onto a road or rail vehicle for transport to another storage facility, and then transferred again to an installation vessel for transport to the offshore site. During all these stages, the blade tip clamp arrangement securely holds the airfoil portion of the blade and protects it from damage.

Features of different claim categories may be combined as appropriate to give further embodiments not described herein.

In the following, without restricting embodiments of the invention in any way, it may be assumed that the wheeled transport means is a vehicle such as a trailer or dolly that can fit underneath the rotor blade in the airfoil section, and that can be used to support the blade while this is being moved from one location to another. A dolly or trailer can be selfpropelled and can have its own drive means, and can be directly or remotely controlled by an operator. In the following, the terms "wheeled transport means" and "dolly" may be used interchangeably as appropriate.

As mentioned above, it can be necessary or advantageous to be able to orient a rotor blade in different positions during the various storage and transport stages between manufacture and installation. For example, a horizontal or "flat" orientation may be more practicable during storage, while a vertical or "upright" orientation may be desirable during transport. Therefore, in a preferred embodiment of the invention, blade tip clamp arrangement is realised for use in at least a first blade orientation ("upright" or essentially vertical) and a second blade orientation ("flat" or essentially horizontal). It is to be understood that the blade need not be removed from the blade tip clamp arrangement in order to alter its position; instead the orientation of the blade tip clamp arrangement can be altered while it holds the blade.

In either position or orientation, the blade tip clamp arrangement can be realised to rest securely on a surface such as the ground, a truck flatbed etc. For example, the blade tip clamp arrangement might have a supporting structure connected to the tip clamp arrangement, and with sufficient height to ensure that the longitudinal axis of the blade is essentially horizontal when the blade is supported by the blade tip clamp arrangement. Since the blade tip clamp arrangement is preferably realised to support the blade in two distinct orientations, two such supporting structures may be preferable, arranged at 90° angles to each other. However, when the blade is being held in a first orientation, the supporting structure corresponding to the second orientation may protrude outward by some considerable distance. Therefore, in a particularly preferred embodiment of the invention, the blade tip clamp arrangement comprises a separate support foot realised to support the tip clamp assembly in the first and/or second blade orientation. The support foot and the tip clamp assembly are preferably realised as physically independent units that can be connected together for at least two distinct blade orientations. In this way, the overall dimensions of the blade tip clamp arrangement can be kept favourably compact. To ensure that the blade is always held securely by the blade tip clamp arrangement without any risk of the tip clamp assembly detaching from the support foot, in a preferred embodiment of the invention the tip clamp assembly comprises a first support foot mounting interface for mounting the tip clamp assembly to the support foot in the first blade orientation, and a second support foot mounting interface for mounting the tip clamp assembly to the support foot in the second blade orientation. A mounting interface can be realised as a locking mechanism to lock the tip clamp assembly to the support foot.

In a preferred embodiment of the invention, the pivot connection interface to the wheeled transport means is realised to allow free rotation (in a horizontal plane) of the rotor blade relative to the wheeled transport means. This is to be understood to mean that if the position of one of the blade or wheeled transport means changes, the other remains stationary. For example, the blade can remain stationary relative to the wheeled transport means as this changes its orientation. In this way, the wheeled transport means can be steered to alter its course during a blade transfer manoeuvre. Preferably, the pivot connection interface is realised to allow a rotation of the rotor blade of at least 20°, preferably at least 30° in the horizontal plane. This rotation is preferably relative to a longitudinal axis of the wheeled transport means so that, for example, a longitudinal axis of the blade can "pivot" about a kingpin connector on either side of the longitudinal axis of a dolly.

The pivot connection interface can be realised in any appropriate way. For example, flexible joint arrangements such as a universal joint, gimbal, or other may be considered. However, in a particularly preferred embodiment of the invention, a kingpin connector is used since this is relatively simple in construction, is quite robust, and is comparatively economical. The kingpin can be arranged on any suitable part of the blade tip clamp arrangement. For example, a kingpin connector can be arranged on one side of the tip clamp assembly. It may be preferred to have two such kingpin connectors on the tip clamp assembly, arranged essentially at a 90° angle to one another, so that the blade tip clamp arrangement can interface to a dolly or trailer in the two distinct orientations mentioned above. Such a kingpin can interface with a suitable connecting part on the wheeled transport means. For example, the kingpin can fit into a "fifth wheel" arranged on a dolly, a tractor unit, etc.

It may be preferred to connect the blade tip clamp arrangement to a wheeled transport vehicle with or without a support foot connected to the tip clamp assembly. Therefore, in a preferred embodiment of the invention, the blade tip clamp arrangement comprises one or more pivot connection interfaces arranged on the tip clamp assembly and/or one or more pivot connection interfaces arranged on the support foot. In this way, various mounting arrangements are possible so that transfer of a blade from one location to another and/or from one orientation to another can be favourably simplified.

The root end bracket of the rotor blade transport and storage arrangement according to embodiments of the invention may also comprise such a pivot connector, so that the root end bracket can also connect to a wheeled transport means. In this way, a very manoeuvrable arrangement can be obtained, so that transfer operations can be carried out quickly and safely even in a relatively confined area such as a harbour loading area, for example when a blade must be transferred onto a ship for transport to an installation site.

The tip clamp assembly can be realised in any suitable manner. For example, the tip clamp assembly can be realised as a clamp that extends about the blade to enclose a section of the blade in a holding arrangement. However, it can be awkward and time-consuming to put such a holding arrangement in place and/or to release such a holding arrangement again. Therefore, in a particularly preferred embodiment of the invention, the tip clamp assembly comprises a number of leading edge clamps, whereby a leading edge clamp is to be understood as a clamping device that fits about the leading edge only, and does not extend across towards the trailing edge side of the blade.

A leading edge clamp can be realised to "connect" to the blade in any suitable manner. In a particularly preferred embodiment of the invention, a leading edge clamp comprises a pair of pivotably mounted friction pads, wherein a friction pad is shaped according to the shape of the rotor blade about the leading edge, and wherein the leading edge clamp is realised to press the friction pads against opposing faces of the rotor blade on either side of the leading edge. For example, the friction pads can have a shallow concave shape to fit over the curved outer surface of the blade. In the context of a leading edge clamp, a pivot mount is to be understood to mean that the friction pads of a pair are hinged so that these can adjust their position relative to the curvature of the blade surface. The friction pads can be made of a suitable high-friction material that will not damage the blade surface. Examples of suitable materials are elastomers, synthetic rubber, ethylene propylene diene monomer rubber (EPDM), etc. A high-friction rubber material, pre-forced by 0.2 MPa, is preferred. A leading edge clamp can be connected to a pressure control means, for example to a hydraulic drive unit which can be realised to press a pair of friction pads to the blade surface about the leading edge, and the pressure may be adjusted as necessary. For example, the pressure may be increased prior to a lifting or transfer operation, and may be decreased when the blade is to be left in storage for a while.

Preferably, a leading edge clamp is realised to clamp about the leading edge of the blade over a distance extending over at most 33%, more preferably at most 25% of the distance between leading edge and trailing edge. For example, if the leading edge to trailing edge distance comprises 1.85 m over the suction side and 1.80 m over the pressure side, a leading edge clamp may be placed such that each friction pad of a friction pad pair covers a portion of the blade surface commencing at some point outward from the leading edge, and extending up to a distance of about 0.62 m in the direction of the trailing edge.

A single long leading edge clamp may be sufficient to hold the blade, for example a leading edge clamp with a pair of friction pads, each about 1.0 m in length. However, in a particularly preferred embodiment of the invention, the tip clamp assembly comprises a plurality of individually operable leading edge clamps. Preferably, the tip clamp assembly comprises at least three such leading edge clamps. In this way, the independently operable leading edge clamps can adjust to slight changes in the curvature of the blade over the section supported by the blade tip clamp arrangement. Preferably, the leading edge clamps are arranged essentially in line along a section of the leading edge of the rotor blade. For example, in a preferred embodiment, the hinge or shared pivot upon which the friction pads are mounted are in line with the leading edge of the blade, i.e. arranged in a line that is essentially parallel (but offset from) the leading edge. In this way, when the blade is held in the upright orientation, the weight of the blade is optimally counteracted by the friction pads of the leading edge clamps.

As indicated above, the rotor blade may be moved from a storage facility to a transport means, and vice versa. This can involve the use of various heavy-duty load lifting means. For example, one or more heavy-duty forklifts may be used to support the blade and also to raise or lower the blade as appropriate. Therefore, in a further preferred embodiment of the invention, the blade tip clamp arrangement comprises at least one interface to a load lifting vehicle. For example, the interface may comprise a pair of lugs spaced to correspond to the distance between the forks, and to fit closely about the forks. The blade tip clamp arrangement can comprise one or more such pairs of lugs. For example, a pair of lugs may be incorporated in the tip clamp assembly and/or a pair of lugs may be incorporated in the support foot.

Moving the blade from place to place may be performed using apparatus such as a forklift as described above, but it may also be advantageous to use a crane to hoist the blade or to assist in moving the blade in conjunction with a forklift. Therefore, in another preferred embodiment of the invention, the blade tip clamp arrangement also comprises a number of eyelets for connecting to a crane hoisting cable. Eyelets can be incorporated in the structure of the blade tip clamp arrangement so that when the blade is suspended from the crane, the blade assumes a horizontal position or an "upright" position.

By equipping the blade tip clamp arrangement with such connecting interfaces to lifting/hoisting means, a change in blade orientation can easily be achieved using the method according to embodiments of the invention. Preferably, the tip clamp assembly is connected to a crane and then lifted out of the supporting means of the blade tip clamp arrangement. The crane is then operated to effect a quarter turn rotation of the blade, i.e. a rotation of about 90°, resulting in a change between first and second blade orientations. Subsequently, the tip clamp assembly is lowered back onto the supporting means.

BRIEF DESCRIPTION

Some of the embodiments will be described in detail, with reference to the following figures, wherein like designations denote like members, wherein.

DETAILED DESCRIPTION

Figure 1:
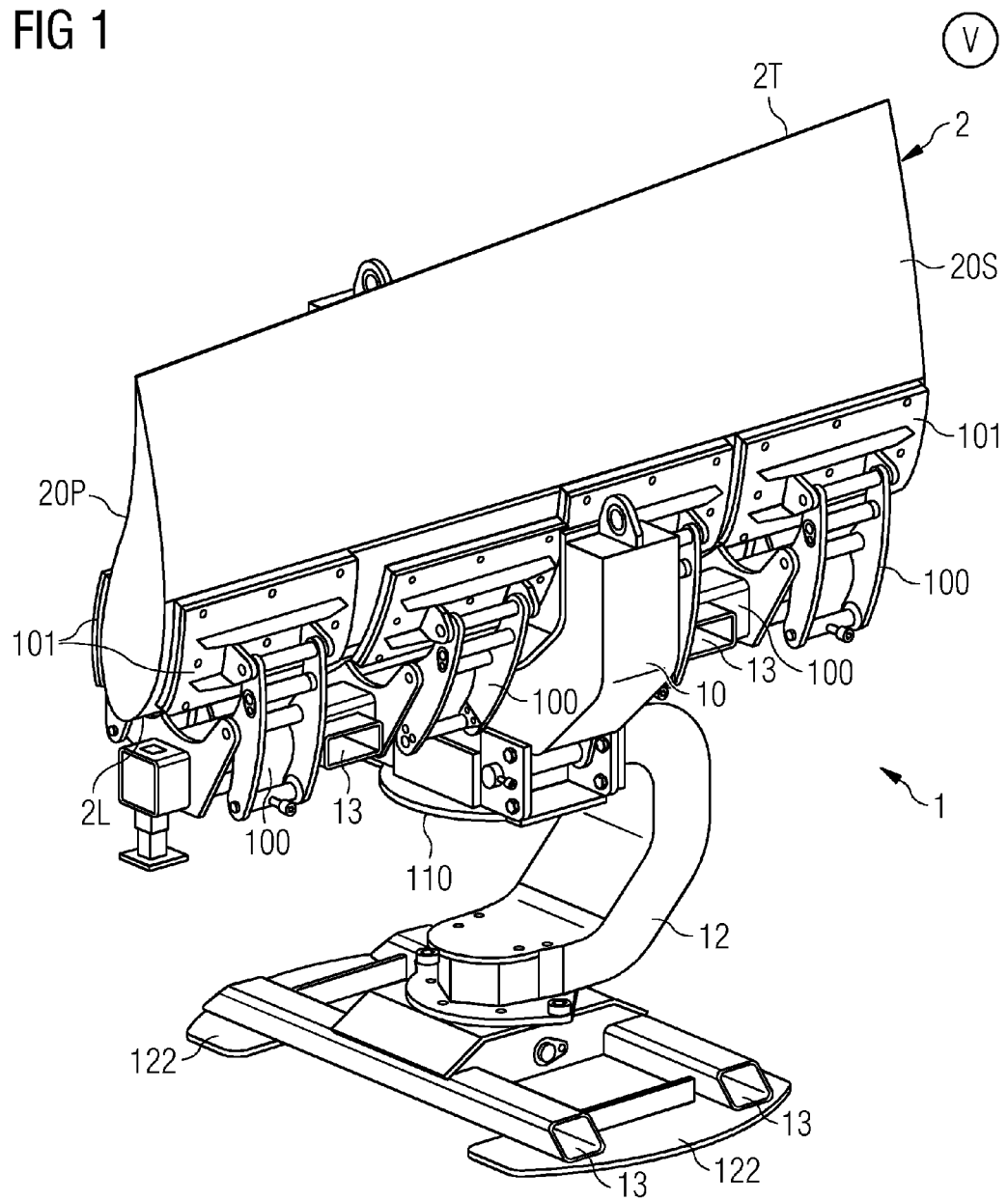
FIG. 1 is a schematic representation of a first embodiment of a blade tip clamp arrangement.

FIG. 1 is a schematic representation of a first embodiment of a blade tip clamp arrangement 1 according to the invention in place about a rotor blade 2. For clarity, only the clamped length portion of the rotor blade 2 is shown. The blade tip clamp arrangement 1 comprises a tip clamp assembly 10 which is detachably mounted on a support foot 12.

The tip clamp assembly 10 uses a number of leading edge clamps 100 to securely press against the rotor blade pressure side 20P and suction side 20S surfaces, in a region close to the leading edge 2L of the blade 2. The blade 2 is being held in a vertical orientation V, so that the trailing edge 2T is uppermost, and the leading edge 2L is underneath. The leading edge clamps 100 are operable independently of each other. Each leading edge clamp 100 uses a pair of opposing friction pads 101 to press against the surface of the blade 2. A kingpin connector (not visible in the diagram) is arranged within a kingpin plate 110, which is realised to rest against a surface of a wheeled transport vehicle as will be explained below.

The support foot 12 is shaped to securely bear the weight of the blade 2 when held in the tip clamp assembly 10. Here, the curved shape of the main body of the support foot 12 can offer a degree of flexibility while at the same time being structurally strong enough to bear the blade's weight.

The blade tip clamp arrangement 1 can rest on the ground using a pair of resting plates 122, and can be lifted as a whole, for example by a forklift truck, with the help of a pair of lugs 13. In this embodiment, the support foot 12 has one pair of lugs 13, and the detachable tip clamp assembly 10 also has a pair of forklift lugs. Therefore, these elements 10, 12 can be handled separately or as a single unit.

Figure 2:
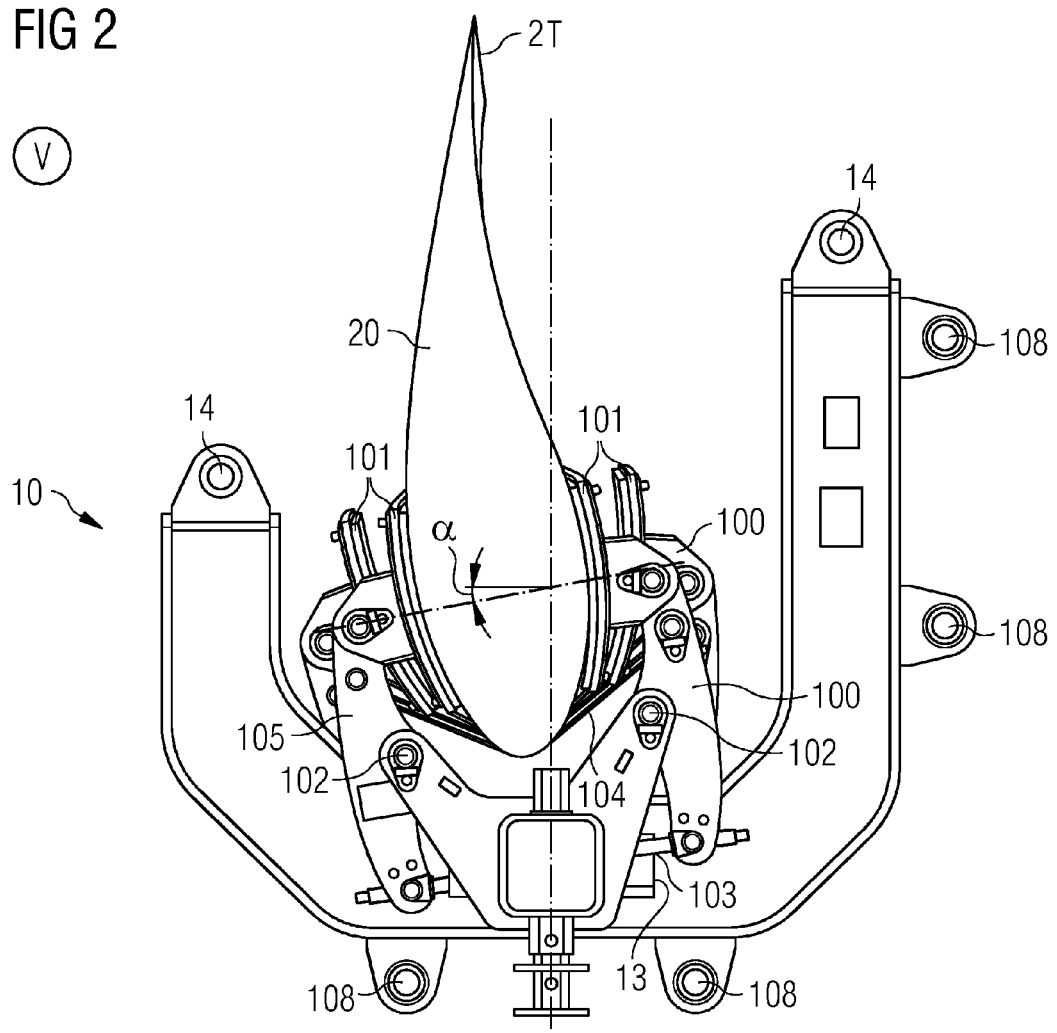
FIG. 2 shows a side view of an embodiment of the blade tip clamp arrangement of FIG. 1.

FIG. 2 shows a side view of the blade tip clamp arrangement 1 of FIG. 1, arranged about the blade airfoil portion 20. The airfoil 20 is shown in cross-section. The diagram shows more clearly the shape of the main body of the tip clamp assembly, and also shows lifting eyelets 14 with which the tip clamp assembly 1 (on its own or as part of a blade tip clamp arrangement) can be hoisted by a crane. The diagram also shows two independent connector arrangements 108 for connecting to a support foot. These allow the tip clamp assembly 10 to be mounted, in one of two different orientations, onto a support foot.

The diagram also clearly shows the manner in which opposing friction pads 101 of leading edge clamps 100 act to grip the airfoil portion 20 of a rotor blade 2. Each friction pad 101 is mounted at the end of a pad arm 105, which in turn is pivotably mounted about a pivot 102. In this embodiment, the pad arms 105 on each side of the blade 2 are pivotably mounted about a shared pivot 102. To press the friction pads 101 of a pair against the rotor blade surface, for example in preparation for a lifting or transfer operation, a spindle 103 can be tightened. The spindle 103, when tightened, acts to push the lower ends of two opposing pad arms 105 outward, thus forcing the friction pads 101 inward against the surface of the rotor blade 2. The diagram shows that a friction pad 101 of the tip clamp assembly 10 only clamps the blade 2 up to about 25%-30% of the distance from leading edge 2L to trailing edge 2T. Before removing the blade 2, or before leaving the blade 2 in short-term storage, the spindle 103 can be loosened to relax the pressure. Each friction pad pair can be adjusted by its own dedicated spindle.

The diagram shows the blade 2 in an upright orientation V with its trailing edge 2T uppermost. The illustration shows that the leading edge clamps 100 are tilted by an angle α. In this embodiment, the angle α corresponds to an angle between the horizontal, and a perpendicular through the airfoil chord at that part of the blade 2. As an added precautionary measure during a transport operation, each friction pad pair can be connected by a strap 104 arranged to lie against the leading edge 2L of the blade 2. A downward motion of the blade 2 will cause the strap 104 to pull the corresponding friction pads 101 inward, pressing them against the blade surface, even if for some reason the spindle 103 should fail or become loosened.

Figure 3:
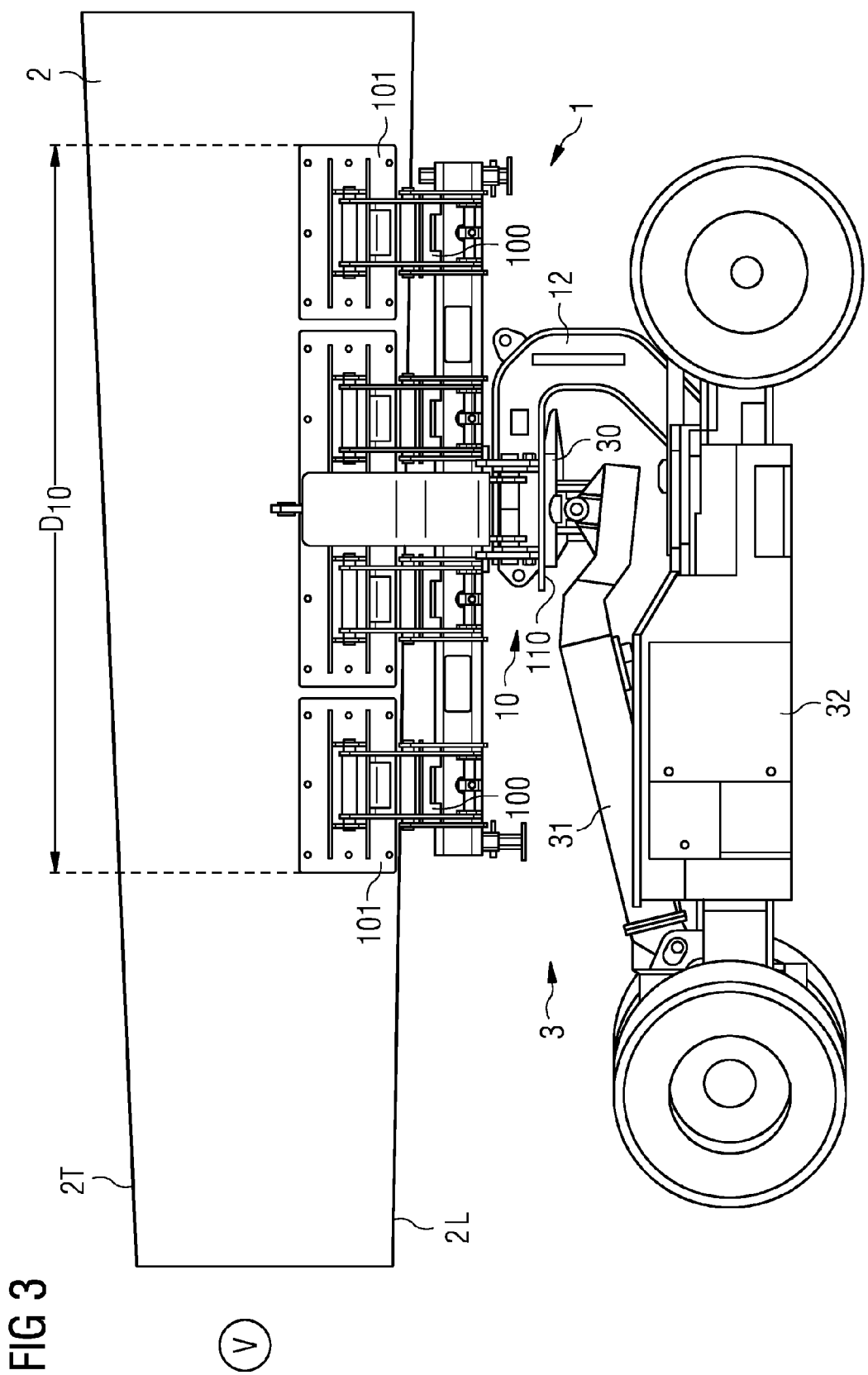
FIG. 3 shows an embodiment of the blade tip clamp arrangement of FIG. 1 mounted to a dolly.

FIG. 3 shows the blade tip clamp arrangement 1 of FIG. 1 mounted to a dolly 3. This is achieved by inserting the kingpin connector of the blade tip clamp arrangement 1 into a corresponding component 30 on the dolly 3, in this case into a "fifth wheel" 30 mounted on the end of a hydraulic lifting arrangement 31. The kingpin plate 110 of the blade tip clamp arrangement 1 rests on the fifth wheel 30, so that the blade tip clamp arrangement 1 can freely rotate relative to the dolly 3, at least within a certain angular region as will be explained below. A forklift truck (not shown) can be used to lift the blade tip clamp arrangement 1—using a pair of lugs as described above—and to lower it so that the kingpin connector fits into the fifth wheel 30, which also acts as an automatic locking device. The dolly 3 is realised as a self-propelled vehicle 3 with a drive motor and control unit 32, for example with a remote control unit for receiving commands issued by an operator (not shown). The dolly 3 can be equipped with sensors (not shown) for detecting a path of travel and/or any obstacles that may be present.

Figure 4:
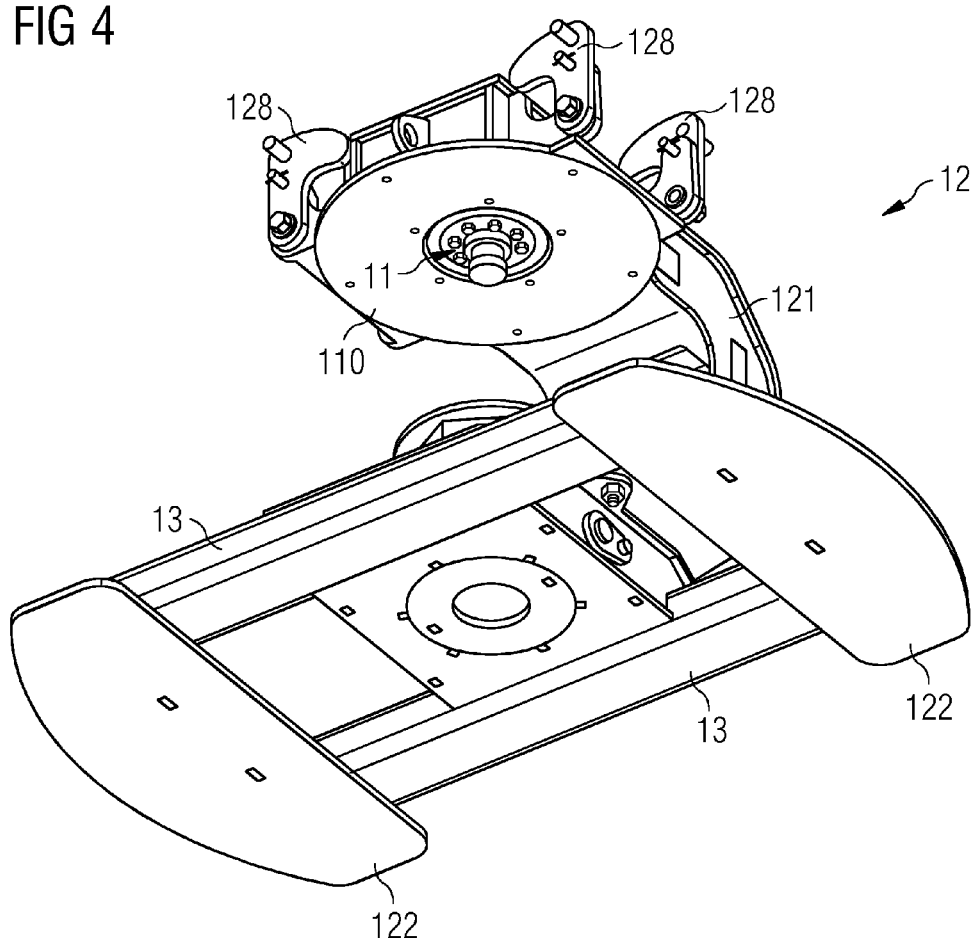
FIG. 4 is a schematic perspective view of a support foot of an embodiment of a blade tip clamp arrangement.

FIG. 4 is a schematic perspective view of a support foot 12 of an embodiment of a blade tip clamp arrangement 1 according to embodiments of the invention. Here, the view is from "underneath" the support foot 12, and shows the kingpin connector 11 and kingpin plate 110. In this embodiment, the main body 121 of the support foot 12 is rotatably mounted between the pair of lugs 13. A pair of resting plates 122 allow the entire support foot 12 to rest securely on the ground. A locking mechanism 128 is used to lock the connectors 108 (as shown in FIG. 2) of the tip clamp assembly 10 to the support foot 12 in one of two distinct orientations.

Figure 5:
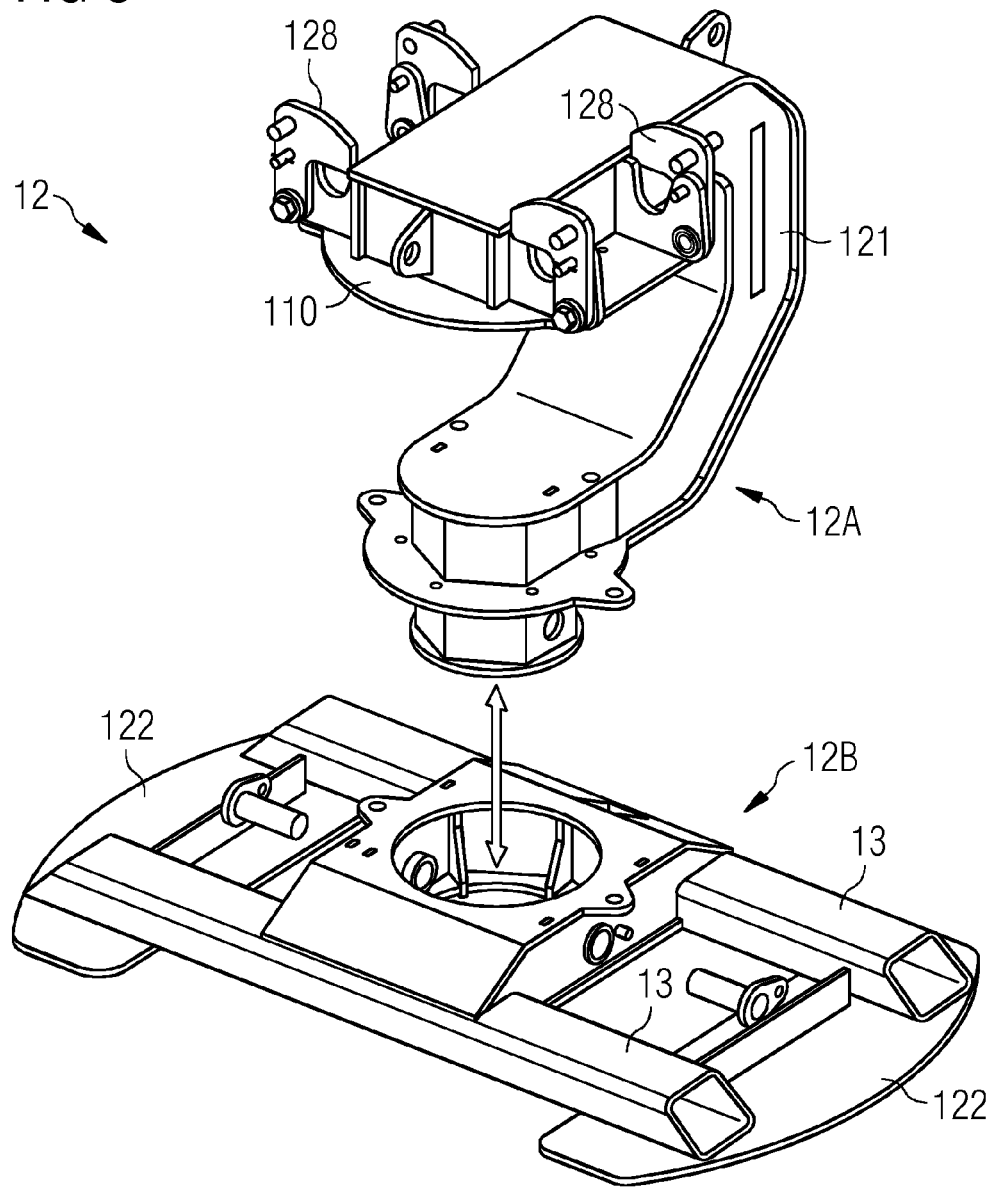
FIG. 5 is a further detailed view of the embodiment of the support foot of FIG. 4.

FIG. 5 is a further schematic drawing of the support foot 12 of a blade tip clamp assembly, showing how the support foot 12 can be realised as two parts 12A, 12B—an upper part 12A and a lower part 12B—that can be assembled or dis-assembled as required. The upper part 12A comprises the main body 121, the kingpin and kingpin plate 110, the tip clamp assembly locks 128, etc. The lower part 12B comprises the forklift lugs 13 and the resting plates 122. For example, when the blade is being held in storage, the upper part 12A of the support foot 12 can be connected to the lower part 12B and secured using a number of bolts or other fastening means. When the blade is to be moved using a blade mover or dolly, in a transport procedure involving turns, the lower part 12B can be disconnected. This allows more freedom of movement between blade and dolly, since these can pivot relative to one another about the kingpin, and the movement is not hampered by the resting plates 122 or lugs 13. For a transport operation that does not involve turns, the two parts 12A, 12B may remain connected.

Figure 6:
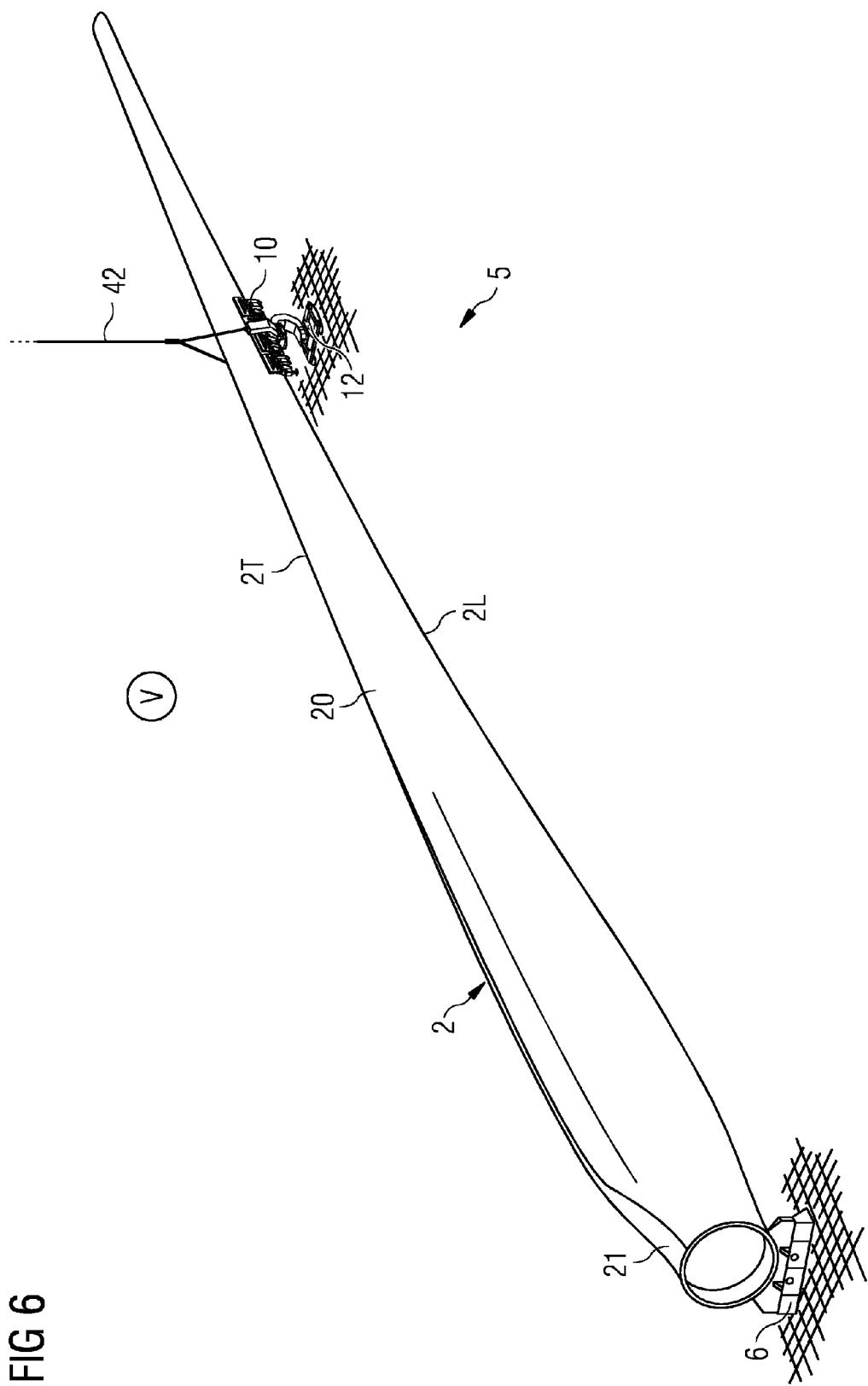
FIG. 6 is a schematic representation of a blade held by an embodiment of a rotor blade transport and storage arrangement.

FIG. 6 is a schematic representation of a blade 2 held by an embodiment of a rotor blade transport and storage arrangement 5 according to the invention. The diagram shows the entire blade 2, with a root end 21 held in a root end bracket 6, and the airfoil portion 20 held by a blade tip clamp arrangement 1. The root bracket 6 and the support foot 12 of the blade tip clamp arrangement 1 are shown resting on the ground. The tip clamp assembly 10 is shown connected to a crane hoisting cable in preparation for, or after completion of, a lifting manoeuvre (for example to change the orientation of the blade 2 from "upright" to "flat" or vice versa). In the diagram, the blade 2 is shown to be held in the vertical or "upright" position, with the trailing edge 2T uppermost and the leading edge 2L underneath.

Figure 7:
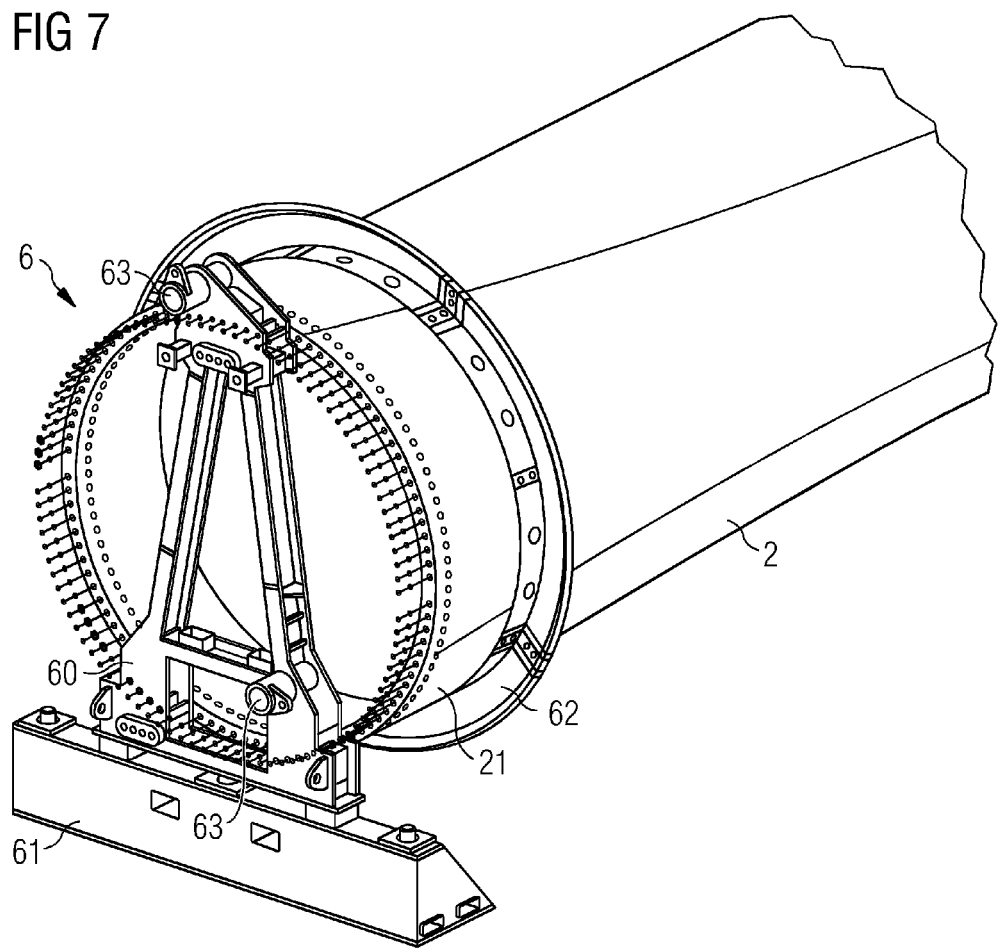
FIG. 7 shows an embodiment of a root end bracket of a rotor blade transport and storage arrangement.

FIG. 7 is a more detailed schematic of the root end bracket 6, showing a brace 60 realised to fit over some of the ring bolts protruding from the circular root end 21. The brace 61 is shown to have a number of transport connectors 63 for connecting to a hydraulic holding arrangement of a truck, as will be explained below. The brace 60 is realised to fit onto a root end support foot 61, so that the root end 21 of the blade 2 can be supported during short-term or long-term storage. This support foot 61 can be disengaged as required for a transfer or transport operation. An additional multi-piece support flange 62 is shown to be arranged about the root end 21, and its purpose is to prevent a distortion of the root end 21 while the blade 2 is being transported and/or stored.

Figure 8:
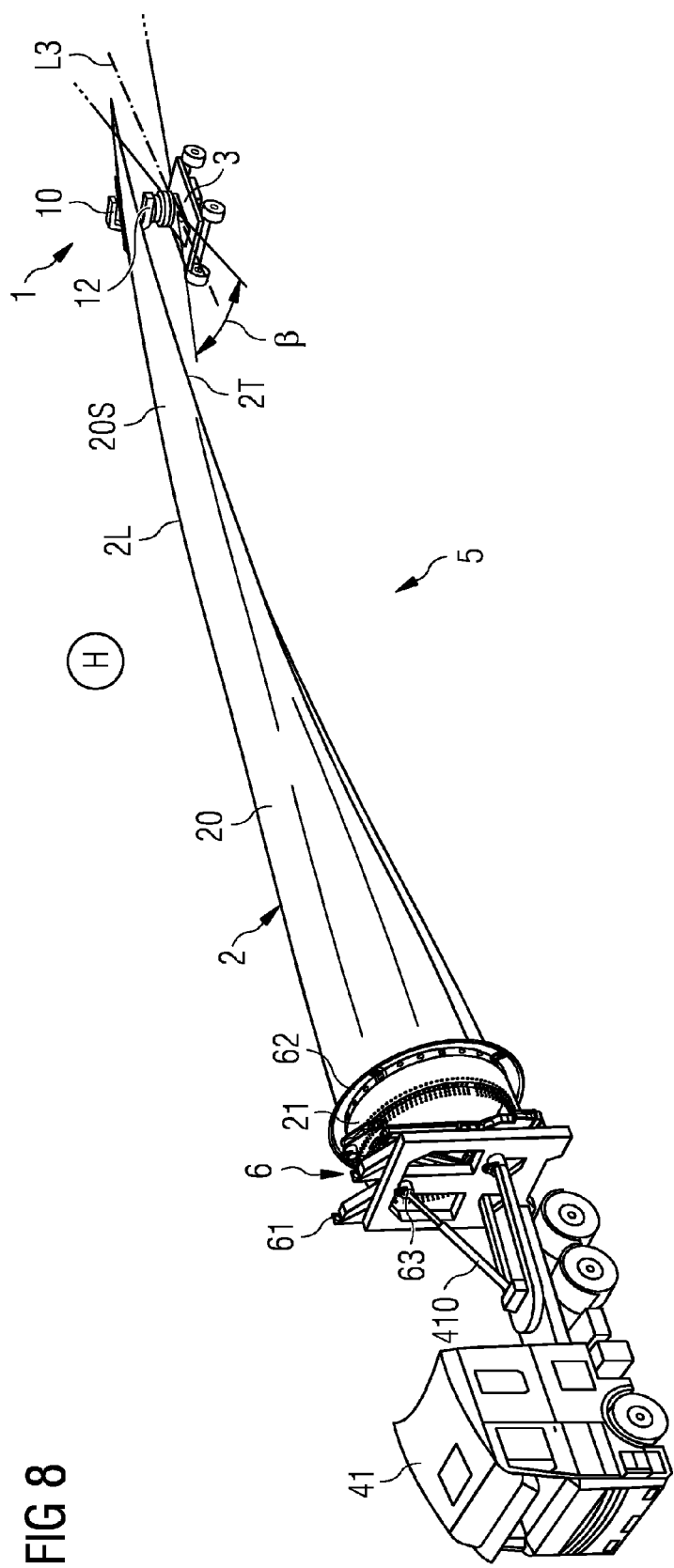
FIG. 8 is a schematic representation of another embodiment of a rotor blade transport and storage arrangement during a road transport operation.

FIG. 8 is a schematic representation of another embodiment of a rotor blade transport and storage arrangement 5 according to the invention during a road transport operation. Here, the root end 21 is held in a root end bracket 6, which in turn is secured to a truck 41 or road tractor 41. The airfoil portion 20 of the blade 2 is held by a blade tip clamp arrangement 1 which in turn is mounted to a dolly 3 or self-propelled trailer 3. In the diagram, the blade 2 is shown to be held in the horizontal or "flat" position, with the suction side 20S uppermost and the pressure side 20P underneath. A portion of the blade 2 close to the tip end is clamped by the tip clamp assembly 10 of the blade tip clamp arrangement 1. Since the tip clamp assembly 10 is rotatably mounted to the dolly 3 by means of the pivotable connection or kingpin, the dolly 3 can change its course direction relative to a longitudinal axis of the blade 2 with a certain angular region. This is indicated in the diagram as the shaded angular portion β about a longitudinal axis $L_3$ of the dolly 3. In this way, road transport is made easier since the dolly is not constrained to follow a straight line according to the longitudinal axis of the blade 2 but can "twist" essentially freely to turn corners in the road, for example.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements. The mention of a "unit" or a "module" does not preclude the use of more than one unit or module.

The invention claimed is:

1. A blade tip clamp arrangement configured to support a wind turbine rotor blade, the blade tip clamp arrangement comprising:
   a tip clamp assembly configured to hold the wind turbine rotor blade along an airfoil portion of the wind turbine rotor blade, wherein the tip clamp assembly includes a plurality of independently operable leading edge clamps mounted about a shared pivot; and
   a pivot connection interface configured to pivotably connect the tip clamp assembly to a wheeled transport means, so that the wind turbine rotor blade freely rotates with respect to a longitudinal axis of the wheeled transport means.

2. The blade tip clamp arrangement according to claim 1, wherein the pivot connection interface comprises a kingpin connector.

3. The blade tip clamp arrangement according to claim 1, wherein the pivot connection interface is configured to allow a rotation of the wind turbine rotor blade of at least 20° relative to a longitudinal axis of the wheeled transport means.

4. The blade tip clamp arrangement according to claim 1, wherein operation of the plurality of leading edge clamps results in the wind turbine rotor blade being positioned in a first blade orientation and a second blade orientation.

5. The blade tip clamp arrangement according to claim 4, comprising a support foot configured to support the tip clamp assembly in the first blade orientation and the second blade orientation.

6. The blade tip clamp arrangement according to claim 1, wherein the pivot connection interface is arranged on a support foot.

7. The blade tip clamp arrangement according to claim 6, wherein a leading edge clamp of the plurality of leading edge clamps comprises a pair of pivotably mounted friction pads, wherein a friction pad of the pair of pivotably mounted friction pads is shaped according to a shape of the wind turbine rotor blade about a leading edge, and wherein the leading edge clamp of the plurality of leading edge clamps is configured to press the pair of pivotably mounted friction pads against opposing faces of the wind turbine rotor blade on either side of the leading edge.

8. The blade tip clamp arrangement according to claim 7, wherein the plurality of leading edge clamps are arranged in line along a section of the leading edge of the wind turbine rotor blade.

9. The blade tip clamp arrangement according to claim 1, comprising at least one interface to a load lifting apparatus.

10. A rotor blade transport and storage arrangement configured for the storage and transport of a wind turbine rotor blade, comprising:
   a blade tip clamp arrangement according to claim 1 for supporting the wind turbine rotor blade along an airfoil portion of the wind turbine rotor blade; and
   a root end bracket for supporting a rotor blade root portion.

11. A method of handling a wind turbine rotor blade during transport and storage, the method comprising:
   providing the blade tip clamp arrangement of claim 1;
   clamping the tip clamp assembly of the blade tip clamp arrangement about an airfoil portion of the wind turbine rotor blade;
   mounting the tip clamp assembly to a supporting means in a first blade orientation for blade storage and blade transport;

mounting the tip clamp assembly to the supporting means in a second blade orientation for blade storage and blade transport; and connecting the pivot connection interface of the blade tip clamp arrangement to the wheeled transport means for a transport manoeuvre.

12. The method according to claim 11, comprising the steps of:

lifting the tip clamp assembly out of the supporting means;

rotating the tip clamp assembly by a quarter turn to effect a change between the first blade orientation and the second blade orientation; and lowering the tip clamp assembly back onto the supporting means.

13. The blade tip clamp arrangement according to claim 1, wherein the pivot connection interface is configured to allow a rotation of the wind turbine rotor blade of at least 30° relative to a longitudinal axis of the wheeled transport means.

* * * * *